United States Patent
Beardslee et al.

(10) Patent No.: US 9,250,867 B2
(45) Date of Patent: *Feb. 2, 2016

(54) PROGRAMMING A MULTI-PROCESSOR SYSTEM

(71) Applicant: COHERENT LOGIX, INCORPORATED, Austin, TX (US)

(72) Inventors: John Mark Beardslee, Menlo Park, CA (US); Michael B. Doerr, Dripping Springs, TX (US); Tommy K. Eng, Pleasanton, CA (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,573

(22) Filed: May 22, 2014

(65) Prior Publication Data

US 2014/0258974 A1 Sep. 11, 2014

Related U.S. Application Data

(63) Continuation of application No. 11/691,889, filed on Mar. 27, 2007, now Pat. No. 8,826,228.

(60) Provisional application No. 60/786,582, filed on Mar. 27, 2006.

(51) Int. Cl.
*G06F 9/44* (2006.01)
*G06F 9/45* (2006.01)
(Continued)

(52) U.S. Cl.
CPC ...... *G06F 8/30* (2013.01); *G06F 8/451* (2013.01); *G06F 9/52* (2013.01); *G06F 9/54* (2013.01); *G06F 9/546* (2013.01)

(58) Field of Classification Search
CPC ............. G06F 8/30; G06F 8/451; G06F 9/52; G06F 9/54; G06F 9/546
USPC .......................................................... 717/106
See application file for complete search history.

(56) References Cited

U.S. PATENT DOCUMENTS 4,493,048 A   1/1985   Kung
4,720,780 A   1/1988   Dolecek
(Continued)

FOREIGN PATENT DOCUMENTS

EP   0266300   1/2008

OTHER PUBLICATIONS

Parker, "A component-based architecture for parallel multi-physics POE simulation," Future Generations Computer Systems, May 13, 2005; p. 204-216, vol. 22, Elsevier Science Publishers, Australia (14 pages).

(Continued)

*Primary Examiner* — Li B Zhen
*Assistant Examiner* — Viva Miller
(74) *Attorney, Agent, or Firm* — Meyertons Hood Kivlin Kowert & Goetzel, P.C.; Jeffrey C. Hood

(57) ABSTRACT

A computer-implemented method for creating a program for a multi-processor system comprising a plurality of interspersed processors and memories. A user may specify or create source code using a programming language. The source code specifies a plurality of tasks and communication of data among the plurality of tasks. However, the source code may not (and preferably is not required to) 1) explicitly specify which physical processor will execute each task and 2) explicitly specify which communication mechanism to use among the plurality of tasks. The method then creates machine language instructions based on the source code, wherein the machine language instructions are designed to execute on the plurality of processors. Creation of the machine language instructions comprises assigning tasks for execution on respective processors and selecting communication mechanisms between the processors based on location of the respective processors and required data communication to satisfy system requirements.

13 Claims, 14 Drawing Sheets

(51) Int. Cl.
*G06F 9/52* (2006.01)
*G06F 9/54* (2006.01)

(56) References Cited

U.S. PATENT DOCUMENTS

| | | |
|---|---|---|
| 4,739,476 A | 4/1988 | Fiduccia |
| 4,807,183 A | 2/1989 | Kung |
| 4,873,630 A | 10/1989 | Rusterholz |
| 4,922,418 A | 5/1990 | Dolecek |
| 4,933,836 A | 6/1990 | Tulpule |
| 4,945,479 A | 7/1990 | Rusterholz |
| 5,109,512 A | 4/1992 | Bahr |
| 5,602,999 A | 2/1997 | Hyatt |
| 5,630,162 A | 5/1997 | Wilkinson |
| 5,634,043 A | 5/1997 | Self |
| 5,689,719 A | 11/1997 | Miura |
| 5,805,915 A | 9/1998 | Wilkinson |
| 5,944,779 A | 8/1999 | Blum |
| 5,963,746 A | 10/1999 | Barker |
| 6,106,575 A | 8/2000 | Hardwick |
| 6,226,776 B1 | 5/2001 | Panchul |
| 6,421,772 B1 | 7/2002 | Maeda |
| 6,433,802 B1 | 8/2002 | Ladd |
| 6,473,805 B2 | 10/2002 | Lewis |
| 6,651,163 B1 | 11/2003 | Kranich |
| 6,694,501 B2 | 2/2004 | Chang |
| 6,766,437 B1 | 7/2004 | Coscarella |
| 6,865,541 B1 | 3/2005 | Beaven |
| 6,898,657 B2 | 5/2005 | Smith |
| 6,968,447 B1 | 11/2005 | Apisdorf |
| 7,130,457 B2 | 10/2006 | Kaufman |
| 7,143,412 B2 | 11/2006 | Koenen |
| 7,234,002 B2 | 6/2007 | Lewis |
| 7,356,670 B2 | 4/2008 | Van Eijndhoven |
| 7,415,594 B2 | 8/2008 | Doerr |
| 7,451,416 B2 | 11/2008 | Drumm |
| 7,487,229 B2 | 2/2009 | Ohly |
| 7,542,981 B2 | 6/2009 | Choy |
| 7,555,566 B2 | 6/2009 | Blumrich |
| 7,814,462 B2 | 10/2010 | Husbands |
| 7,853,937 B2 * | 12/2010 | Janczewski ............... 717/149 |
| 2001/0042135 A1 * | 11/2001 | Lewis ........................ 709/246 |
| 2001/0042138 A1 | 11/2001 | Buendgen |
| 2003/0163507 A1 | 8/2003 | Chang |
| 2004/0103265 A1 | 5/2004 | Smith |
| 2012/0023295 A1 | 1/2012 | Nemawarkar |
| 2012/0254879 A1 | 10/2012 | Chung |

OTHER PUBLICATIONS

Agarwal, et al. "The MIT Alewife Machine", Proceedings of the IEEE, vol. 87, No. 3, Mar. 1999, p. 430-444 (16 pages).
Houzet, et al., "A shared memory model on a cluster of PCs", Microprocessors and Microsystems, May 21, 1999; vol. 23, p. 125-134, Elsevier Science B.V., Australia (10 pages).
Kimelman, et al., "Visualizing the Execution of High Performance Fortran (HPF) Programs", Proceedings of the 49th International Parallel Processing Symposium, Santa Barbara, CA, Apr. 25-28, 1995, p. 750-759; IEEE Computer Society, Los Alamitos, CA (10 pages).
International search report and written opinion for application No. PCT/US2007/065268, mailed Sep. 21, 2007 (15 pages).
Agarwal, "Raw Computation," Scientific American, Aug. 1999, p. 44-47, vol. 281, No. 2 (5 pages).
Waingold, et al., "Baring It All to Software: Raw Machines," IEEE Computer, Sep. 1997, p. 86-93 (8 pages).
Taylor, et al., "The Raw Microprocessor: A Computational Fabric for Software Circuits and General-Purpose Programs," IEEE Micro, Mar.-Apr. 2002, p. 25-35 (11 pages).
Lee, et al., "Space-Time Scheduling of Instruction-Level Parallelism on a Raw Machine," Proceedings of the Eighth International Conference on Architectural Support for Programming Language and Operating Systems (ASPLOS-8), Oct. 1998 (11 pages).
Barua, et al., "Compiler Support for Scalable and Efficient Memory Systems," IEEE Transactions on Computers, Nov. 2001, p. 1-32 (32 pages).
Lee, et al., "Convergent Scheduling," Proceedings of the 35th International Symposium on Microarchitecture (MICRO-35), Nov. 2002, p. 1-12, Istanbul, Turkey (12 pages).
Babb, et al., "Parallelizing Applications into Silicon," Proceedings of the IEEE Workshop on FPGAs for Custom Computing Machines '99 (FCCM '99), Apr. 1999 (11 pages).
Babb, et al., "The RAW Benchmark Suite: Computation Structures for General Purpose Computing," IEEE Symposium on Field-Programmable Custom Computing Machines (FCCM '97), Apr. 1997 (10 pages).
Babb, et al., "Solving Graph Problems with Dynamic Computation Structures," SPIE Proceedings, Oct. 21, 1996; vol. 2914 (12 pages).
Frank, et al., "SUDS: Primitive Mechanisms for Memory Dependence Speculation," MIT/LCS Technical Memo LCS-TM-591; Jan. 6, 1999, p. 1-9 (9 pages).
Barua, "Maps: A Compiler-Managed Memory System for Software-Exposed Architectures," PhD Thesis, MIT Laboratory for Computer Science, Jan. 2000 (161 pages).
Barua, et al., "Maps: A Compiler-Managed Memory System for Raw Machines," Proceedings of the Twenty-Sixth International Symposium on Computer Architecture (ISCA-26), Atlanta, GA; Jun. 1999; p. 1-12 (12 pages).
Barua, et al., "Memory Bank Disambiguation using Modulo Unrolling for Raw Machines," Proceedings of the Fifth International Conference on High Performance Computing, Dec. 1998 (9 pages).
Moritz, et al., "Hot Pages: Software Caching for Raw Microprocessors," MIT/LCS Technical Memo LCS-TM-599, Aug. 1999 (12 pages).
Miller, "Software Based Instruction Caching for the RAW Architecture," Master of Engineering in Electrical Engineering and Computer Science Thesis, Massachusetts Institute of Technology; May 20, 1999 (39 pages).
Taylor, et al., "How to build scalable on-chip ILP networks for a decentralized architecture," MIT/LCS Technical Memo MIT-LCS-TM-628, Apr. 2000 (15 pages).
Taylor, et al., "Scalar Operand Networks: On-chip Interconnect for ILP in Partitioned Architectures," MIT/LCS Technical Report LCS-TR-859, Jul. 2002 (20 pages).
Taylor, "Design Decisions in the Implementation of a Raw Architecture Workstation," Master of Science Thesis, Massachusetts Institute of Technology, Sep. 1999 (90 pages).
Moritz, et al., "Exploring Optimal Cost-Performance Designs for Raw Microprocessors," Proceedings of the International IEEE Symposium on Field-Programmable Custom Computing Machines (FCCM 98), Apr. 1998 (16 pages).
Agarwal, et al., "The Raw Compiler Project," Proceedings of the Second SUIF Compiler Workshop, Stanford, CA, Aug. 21-23, 1997 (12 pages).

\* cited by examiner

```
ndemo – Main Program                                    [X]
#include "hyperx.h"
#include "mpi.h"

_shared int atod[N], bandPass[N], hilbert[N], ifft[N], qfft[N];
_shared int autoCorr[N], crossCorr[N], inv_ifft[N], inv_qfft[N];

int main( int argc, char** argv)
{
    if (MPI_TASK == 0) {
      atod = read();
    } else if (MPI_TASK == 1) {
      bandPass = Fir( atod, coeff );
    } else if (MPI_TASK == 2) {
      hilbert = Fir( atod, coeff );
    } else if (MPI_TASK == 3) {
      ifft = FFT( bandPass, 4096 );
    } else if (MPI_TASK == 4) {
      qfft = FFT( hilbert, 4096 );
    } else if (MPI_TASK == 5) {
      autoCorr = CORR( ifft, ifft );
    } else if (MPI_TASK == 6) {
      crossCorr = CORR( qfft, qfft );
    } else if (MPI_TASK == 7) {
      inv_ifft = IFFT( autoCorr, 4096 );
      write( inv_ifft );
    } else if (MPI_TASK == 8) {
      inv_qfft = IFFT( crossCorr, 4096 );
      write( inv_qfft );
    }
    return 0;
}
```

*FIG. 8a*

PROGRAMMING A MULTI-PROCESSOR SYSTEM

PRIORITY CLAIM

This application is a continuation of U.S. patent application Ser. No. 11/691,889 titled "Programming a Multiprocessor System" filed on Mar. 27, 2007, which claims benefit of provisional application Ser. No. 60/786,582 titled "Method and System for Programming a Multi-Processor System" filed on Mar. 27, 2006, both of which are hereby incorporated by reference in their entirety as though fully and completely set forth herein.

FIELD OF THE INVENTION

The present invention relates to the methodology and tools used to program a computing system with multiple processors.

DESCRIPTION OF THE RELATED ART

The traditional approach to increase processor performance by increasing clock speed is reaching an end due to the significant drop in power efficiency at high clock frequencies. Computing systems employing multiple processors have emerged as a solution to the performance scaling problem in computation. The emergence of multi-processor systems requires a fundamental change in the conventional programming paradigm, from single-threaded serial programming and sequential execution to parallel programming and concurrent execution.

From the programming perspective, the shift from a single-processor to a multi-processor hardware architecture requires a re-thinking of algorithm development, and specifically the optimal way to use memory and communication. New issues are also present in managing the sheer complexity of many processes running concurrently. The ability to implement a multi-processor system on multicore chips drastically alters the balance between processing, memory access, and communication.

For instance, in a traditional single-processor system, the memory tends to be large, unified, and hierarchical. Memory access is fast and communication is relatively costly in terms of speed and power, hence the strategy of minimizing communication when multiple conventional single-processor systems are linked together to form a multi-processor system. In a multi-processor system based on highly integrated and connected multicore processor chips, the cost of communication is relatively inexpensive. Ample communication channels are provided for processors to communication with other processors or memory efficiently, therefore, memory in such systems tends to be smaller, distributed, and less hierarchical. As a result, the different memory architecture and the complex communication mechanism of a modern multi-processor system present significant programming productivity challenges.

Therefore, improved tools and an improved methodology are desired to improve the productivity of parallel programming.

SUMMARY OF THE INVENTION

Embodiments of the invention may be used in a multi-processor system, i.e., a parallel computational platform comprising multiple processors, memories (unified and/or distributed), and communication network resources. One exemplary multi-processor system comprises a system referred to as the HyperX architecture. In summary, the central core building block of the HyperX architecture is a scalable unit-cell-based hardware fabric, a HyperSlice. The entire hardware architecture is formed by replicating this core unit-cell to create a multi-core parallel processing system. Each HyperSlice contains a DMR (Data Memory and Router) and Processing Element (PE). The DMR provides data memory, control logic, registers, and routers for fast routing services to the processing resources. The architecture of the DMR allows different interchangeable PEs to be used in a multi-processor fabric to optimize the system for specific applications. A HyperX multi-processor system may comprise either a heterogeneous or homogeneous array of PEs.

Developing a parallel compiler for such a wide variety of possible PE combinations is a prohibitively expensive undertaking. Embodiments of the present invention circumvent this problem by creating a number of automation steps to effectively break up the parallel program into multiple conventional serial programs for each processor in the system so that conventional compilers written for single processor systems can be used.

Embodiments of the present invention allow efficient program development without requiring expertise in parallel programming or detailed knowledge of the architecture of the machine. Programs are written to be structurally independent of the actual processor core or other resources used. The object code produced can be easily re-targeted to any processor core in the system. Communication, task allocation to processor, and memory allocation for program variables are performed automatically to satisfy system level design constraints such as latency, throughput, power, and resource limitations. Communication is accomplished by message passing or shared memory, expressed in symbolic form in the program and does not require the need to understand the hardware architecture of the communication fabric. A communication synthesis process is created to convert the symbolic communication representation into an efficient physical communication routing scheme without deadlocks. The design system has a continuous verification flow from top to bottom. Tests used at the high level can be used to verify the design at lower level of the design flow.

Finally, embodiments of the present invention provide a mechanism to express and model parallelism inherent in the design graphically or procedurally, to optimize parallelism manually or automatically, and to visualize parallelism graphically and interactively.

In one embodiment, a computer-implemented method for creating a program for a multi-processor system is described. The multi-processor system comprises a plurality of processors, wherein each of the processors is coupled to at least one other processor, and wherein there are multiple communication mechanisms between the respective processors. The multi-processor system may comprise a plurality of memories coupled to the processors, e.g., interspersed among the processors. More specifically, the multi-processor system may comprise a plurality of communication units coupled to, e.g., interspersed among, the processors, wherein each of the communication units comprises a memory and routing logic.

The method may comprise first storing source code in response to user input, wherein the source code specifies first functionality. For example, a user may specify or create the source code using a programming language. The source code is intended to execute on the multi-processor system. The source code specifies a plurality of tasks and communication of data among the plurality of tasks. However, the source code may not (in one embodiment is not required to) 1) explicitly specify which physical processor will execute each task and/or 2) explicitly specify which communication mechanism to use among the plurality of tasks. The source code may specify communication between tasks in symbolic 'send' and 'receive' form. The possible communication mechanisms may comprise messages passed between respective ones of the processors or the use of shared variables between respective ones of the processors.

The method then creates machine language instructions based on the source code, wherein the machine language instructions are designed to execute on the plurality of processors. In other words, the method compiles the source code into machine language instructions (also called "object code"). Creation of the machine language instructions comprises assigning tasks for execution on respective processors if task allocation is not explicitly specified in the source code. Creation of the machine language instructions may also comprise selecting communication mechanisms between the processors based on location of the respective processors and required communication of data if the communication mechanism is not explicitly selected in the source code. The created machine language instructions are stored on a memory. The machine language instructions are executable on the multi-processor system to implement the first functionality specified by the original source code program instructions.

Creation of the machine language instructions comprises allocating local variables to memories proximate to the processors executing tasks that own the local variables. The allocation of local variables to memories may be performed based on data size and resource availability within the respective communication units.

In one embodiment, one or more of the tasks use shared variables, and the creation of the machine language instructions comprises allocating tasks using common shared variables to neighboring processors which share access to the same memories. The allocation of tasks using common shared variables is preferably performed prior to allocating tasks that do not have common shared variables.

The method may create a performance model based on the source code, wherein the performance model is designed to optimize for one or more of latency, throughput, and power. For example, in one embodiment, for each of one or more respective communications, the method determines a data location of data as well as the location of the sending and receiving blocks of the respective communication. The method then creates a performance model for the respective communication. The communication mechanisms between the tasks or processors may then be selected based on the performance model. Selection of communication mechanisms may comprise synthesizing communication links between processors by binding communication requirements in the source code to the routing logic. The binding may be performed based on maximum utilization of available routing resources to minimize performance-robbing communication congestion and collision and to reduce the potential of fatal communication deadlocks.

As one example, the source code specifies a first message, at least one message send command for the first message, at least one message receive command for the first message, source information for the first message, and destination information for the first message. The source information and the destination information may be expressed in symbolic terms, wherein the source information and the destination information do not specify a location of a processor to execute the at least one message send command and the at least one message receive command. Creation of the machine language instructions may comprise allocating tasks sending and/or receiving messages to specific processors. Creation of the machine language instructions may also comprise determining the optimal communication mechanism to use for the message.

In one embodiment, the method creates a communication dependency graph for all communication channels supporting multiple message passing. The method then determines if a dependency exists between communications using the same channel. If so, the method may automatically reassign the routing channel so that conflicting communications occur on different physical routes. If re-assignment is not feasible, the method may explicitly schedule the communication channel to prevent a deadlock from occurring.

In one embodiment, multiple tasks are clustered, scheduled, and allocated to a processor for serial execution without deadlock. Communications between tasks allocated to the same processor are performed using variables/memory shared between the tasks within a processor, resulting in the most efficient form of communication without synchronization overhead.

In one embodiment, the creation of the machine language instructions comprises breaking up the program instructions into multiple conventional serial programs for each processor in the multi-processor system. The method then executes conventional compilers designed for single processor systems to compile each of the multiple conventional serial programs.

BRIEF DESCRIPTION OF THE DRAWINGS

FIGS. 1-6 further depict a trace of an algorithm executing on the multi-processor system (or network); FIGS. 1-6 may also represent a GUI for specifying and/or viewing operation of the multi-processor system;

FIG. 8a illustrates an example main program representing a system/algorithm in ANSI-C and explicitly using the SPMD programming model.

DETAILED DESCRIPTION OF THE EMBODIMENTS

Figure 1:
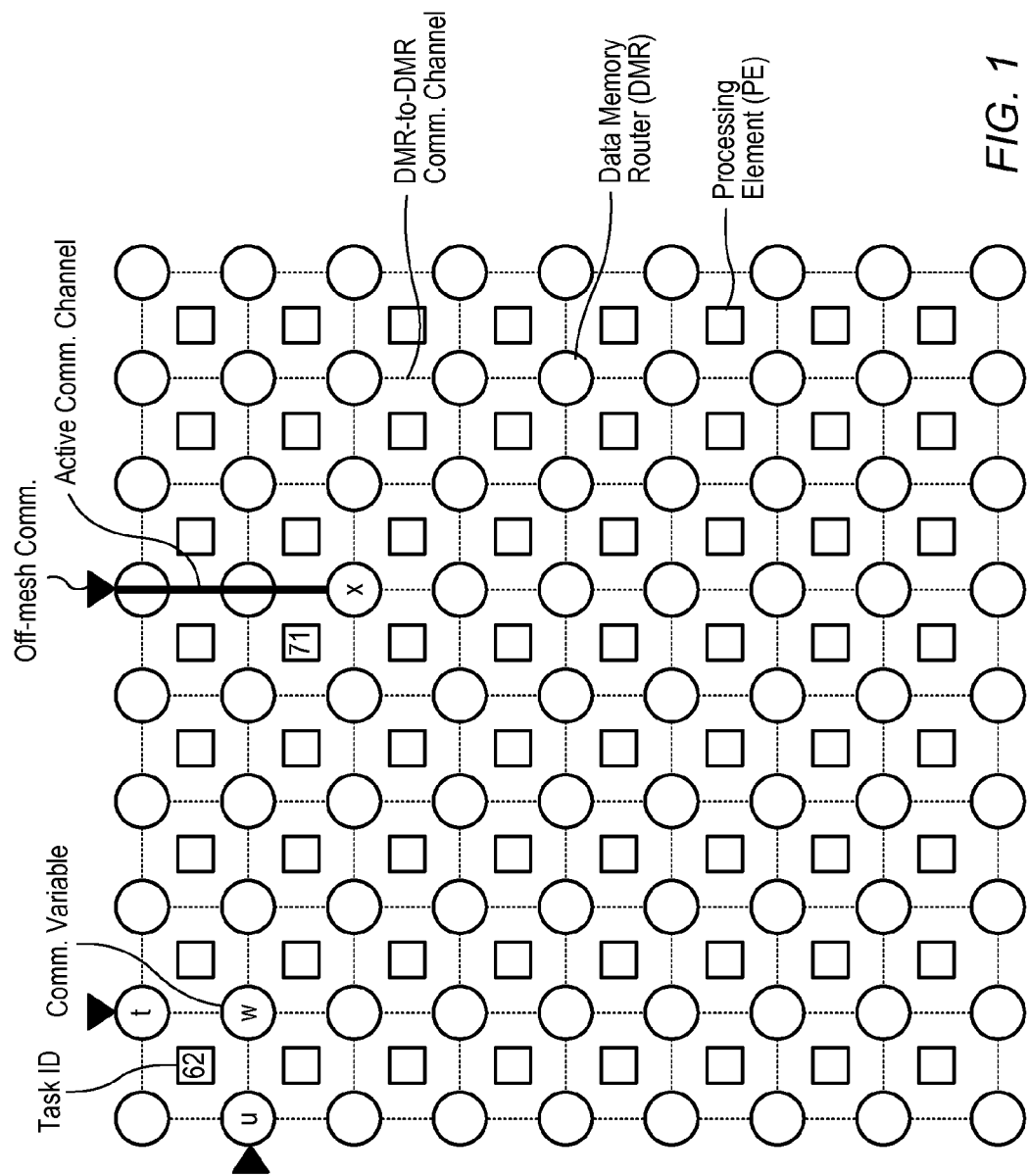
FIGS. 1-6 illustrate a network of processing elements (PE's) and Data Memory Routers (DMRs) of a HyperX system.

A multi-processor system is a parallel computational platform comprising multiple processors, memories (unified and/or distributed), and communication (or communication network) resources. An exemplary multi-processor system comprises a plurality of processors, wherein each of the processors is coupled to at least one other processor, and wherein there are multiple communication mechanisms between the respective processors. The multi-processor system may comprise a plurality of memories coupled to the processors. For example, the memories may be interspersed among the processors. More specifically, the multi-processor system may comprise a plurality of communication units interspersed among the processors, wherein each of the communication units comprises a memory and routing logic. As used herein, the term "coupled" means directly or indirectly connected.

An example of such a multi-processor system is the multicore HyperX architecture disclosed in pending patent application Ser. No. 10/602,292 titled "Processing System With Interspersed Processors And Communication Elements" filed on Jun. 24, 2003, Patent Publication No. US 20040030859, whose inventors are Michael B. Doerr, William H. Hallidy, David A. Gibson and Craig M. Chase, and which is hereby incorporated by reference in its entirety as though fully and completely set forth herein.

In summary, the central core building block of the HyperX architecture is a scalable unit-cell-based hardware fabric, a HyperSlice. The entire hardware architecture is formed by replicating this core unit-cell to create a multi-core parallel processing system. Each HyperSlice contains a DMR (Data Memory and Router) and Processing Element (PE).

The DMR provides data memory, control logic, registers, and routers for fast routing services to the processing resources. The hardware fabric is created by joining HyperSlices together, forming the on-chip network. This on-chip network operates independently and transparently to the processing resources. It provides on-demand bandwidth through a real-time programmable and adaptable communication fabric between HyperSlices supporting arbitrary network topologies of functions or system implementations. Coordinated groups of HyperSlices may be formed and reformed "on-the-fly" under software control. This ability to dynamically alter the amount of hardware used to evaluate a function allows for the optimal application of hardware resources to relieve processing bottlenecks.

The DMR provides nearest neighbor, regional, and global communication across the chip and from chip to chip. The DMR does this through four different transfer modes; memory to memory, memory to register, register to memory, and register to register. Each of the transfer modes may physically use the DMR resources to send data/messages differently depending on locality of data and software algorithm requirements. A "Quick Port" facility is provided to transfer a word of data from a processor to anywhere rapidly. For block transfers, Direct Memory Access (DMA) engines within the DMR are available to manage the movement of data across the memory and routing fabric. For nearest neighbor communication, the use of shared memory and registers is the most efficient method of data movement. For regional and global data movement, using the routing fabric is the most efficient method. Communication channels can either be dynamic or static. Dynamic routes are set up for data transfer and torn down upon the completion of the transfer to free up routing resources for other data transfers. Static routes remain in place throughout the program execution and are primarily used for high priority and critical communications. All data transfers and the choice of communication channel are under software program control. Multiple communication channels exist to support simultaneous data transfer between any senders and receivers.

The architecture of the DMR allows different interchangeable PEs to be used in a multi-processor fabric to optimize the system for specific applications. A HyperX multi-processor system may comprise either a heterogeneous or homogeneous array of PEs. A PE may be a conventional processor, or alternatively a PE may not conform to the conventional definition of a processor. A PE may simply be a collection of logic gates serving as a hard-wired processor for certain logic functions where programmability is traded off for higher performance, smaller area, and/or lower power.

FIGS. 1-6: Exemplary Multi-Processor System

In FIG. 1 a view of the network of processing elements (PE's) and Data Memory Routers (DMRs) of a HyperX system is shown. The PE's are shown as boxes and the DMRs are shown as circles. The routing channels between DMRs are shown as dotted lines. Solid triangles show off-mesh communication and solid lines show active data communication between DMRs. A computational task is shown by its numerical identifier and is placed on the PE that is executing it. A data variable being used for communication is shown by its name and is placed on the DMR that contains it.

In this section we will show a trace of an algorithm executing on this computational mesh. The algorithm is deliberately simple and sparse for illustrative purposes.

The algorithm brings sample data onto the mesh, processes the data, and then sends the result off mesh. Then the algorithm starts over at the beginning, and brings the next set of sample data onto the mesh.

Figure 2:
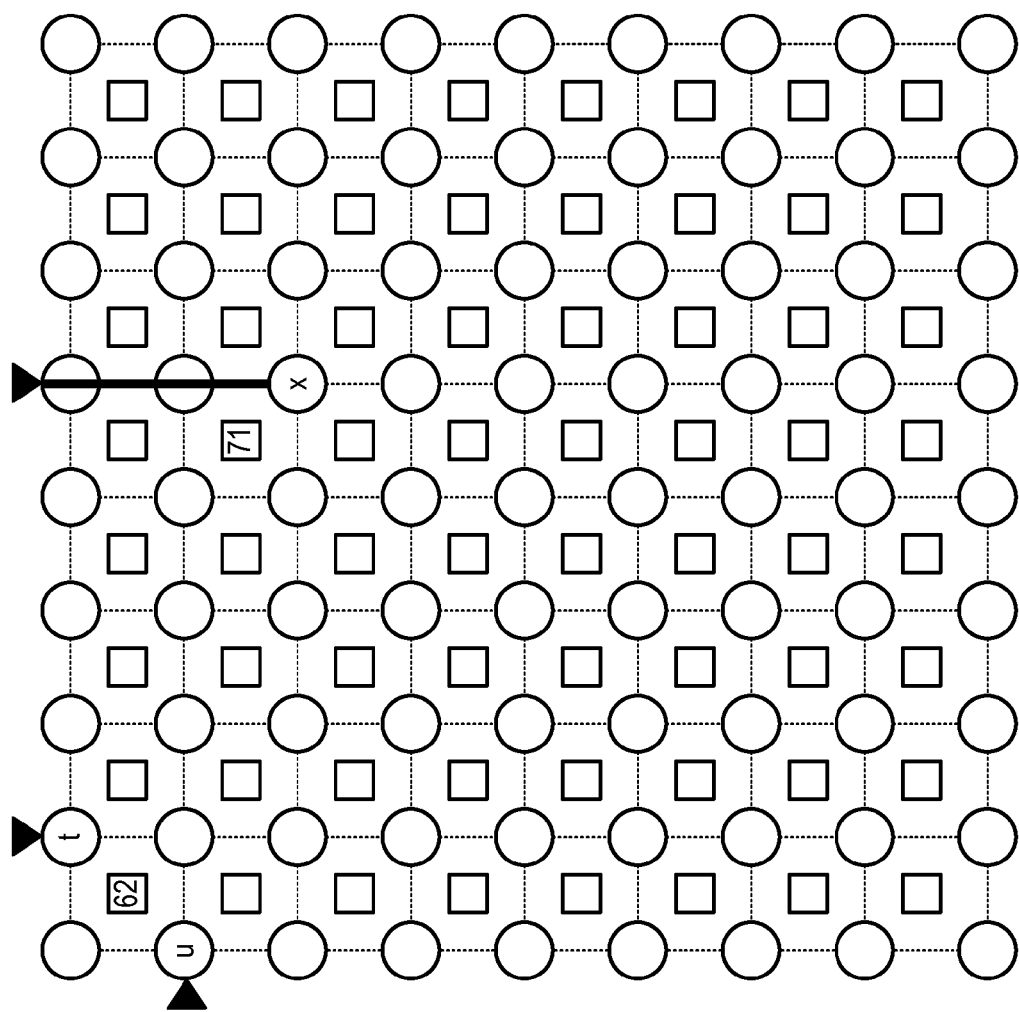
Figure 3:
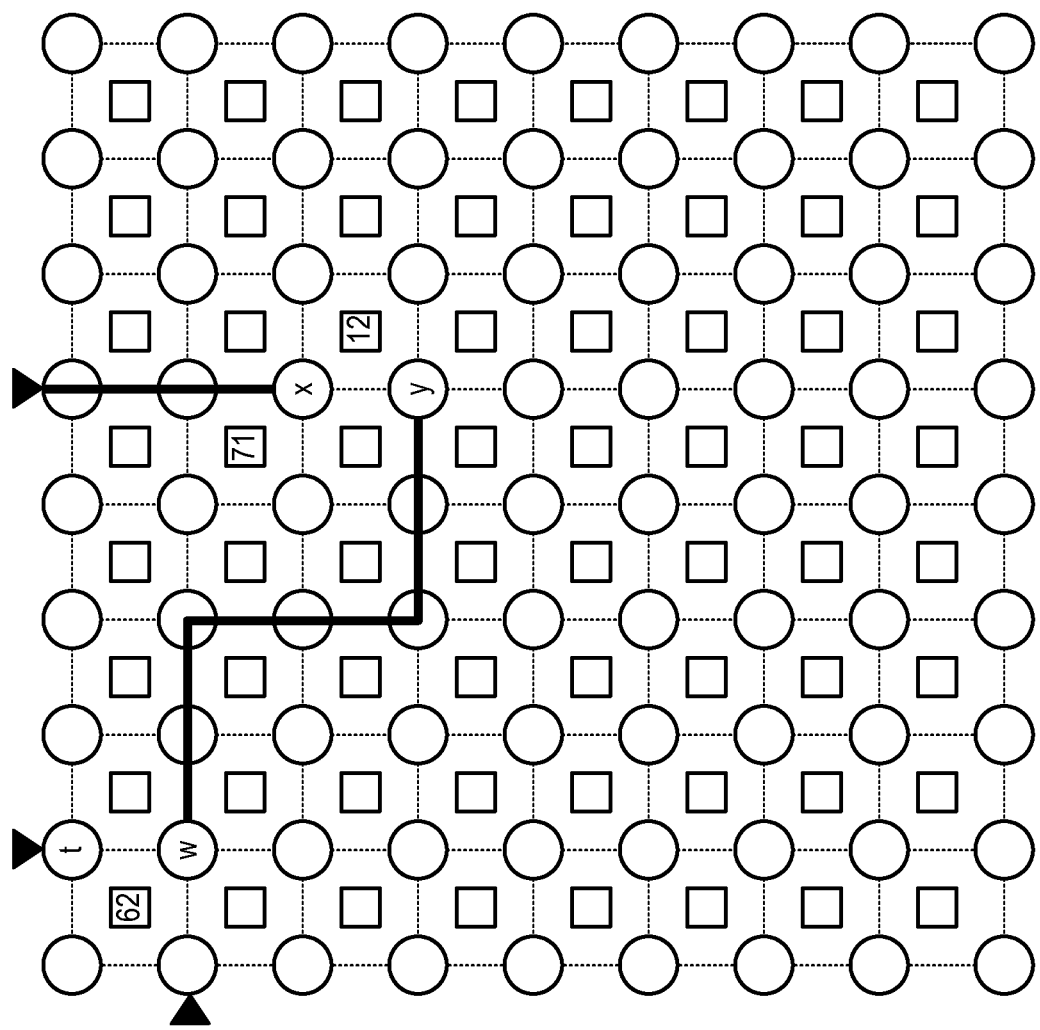

In FIG. 2, task 62 is reading data from off-mesh sources and storing the data in variables "t" and "u". At the same time, task 62 is combining variables "t" and "u" and writing the results into variable "w". Simultaneously, task 71 is bringing data from off-mesh and storing it in variable "x".

At some later time (FIG. 3), task 62 finishes reading variables "t" and "u" and begins transmitting variable "w" to task 12 where it will be further processed. Task 12 must wait until variable "w" and variable "x" are both available to begin its next computational task.

Figure 4:
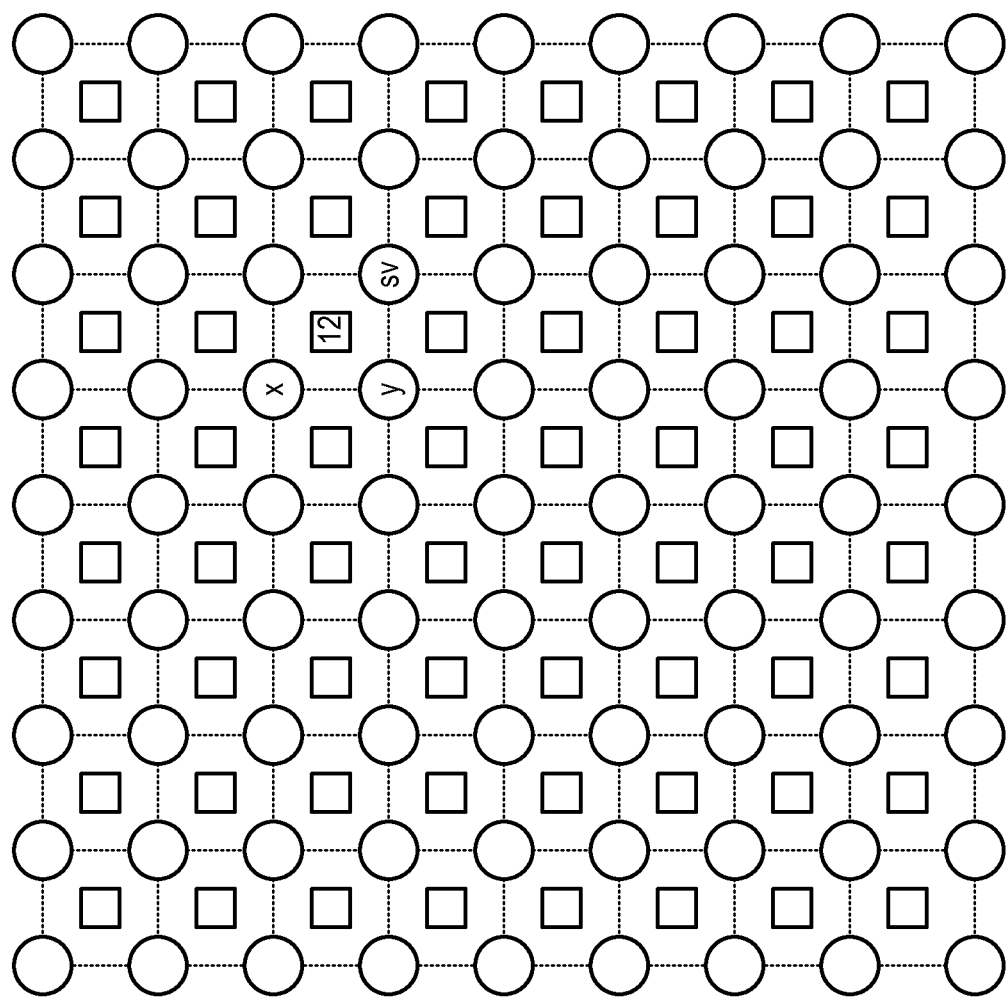

Once the data is ready, task 12 computes variable "sv" from its inputs "x" and "y" (FIG. 4). "sv" is a shared variable.

Figure 5:
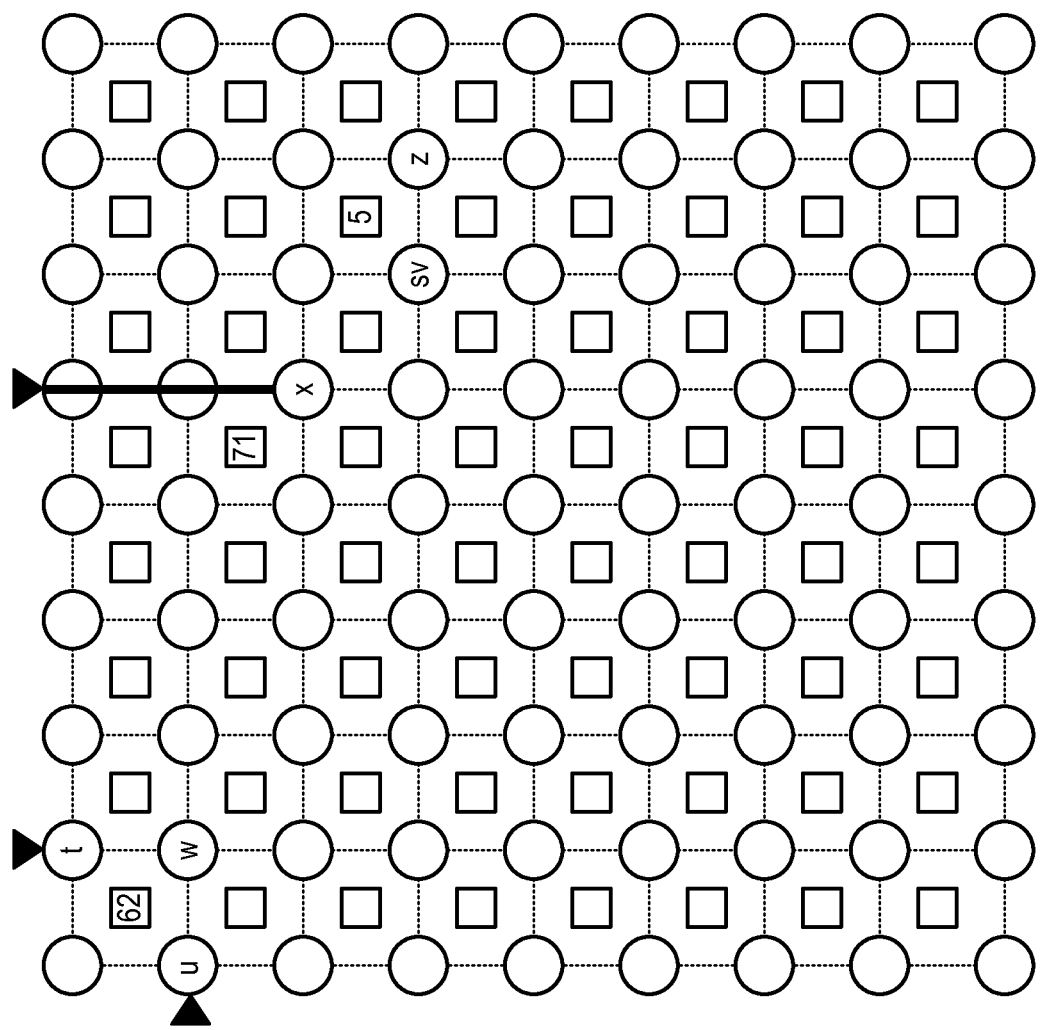

In FIG. 5, shared variable "sv" is acted on by task 5 to produce variable "z". Since "sv" is shared, there is no explicit communication between tasks 12 and 5 but there is synchronization between the tasks. Simultaneously, tasks 62 and 71 start reading the next data samples from off-mesh (as in FIG. 2).

Figure 6:
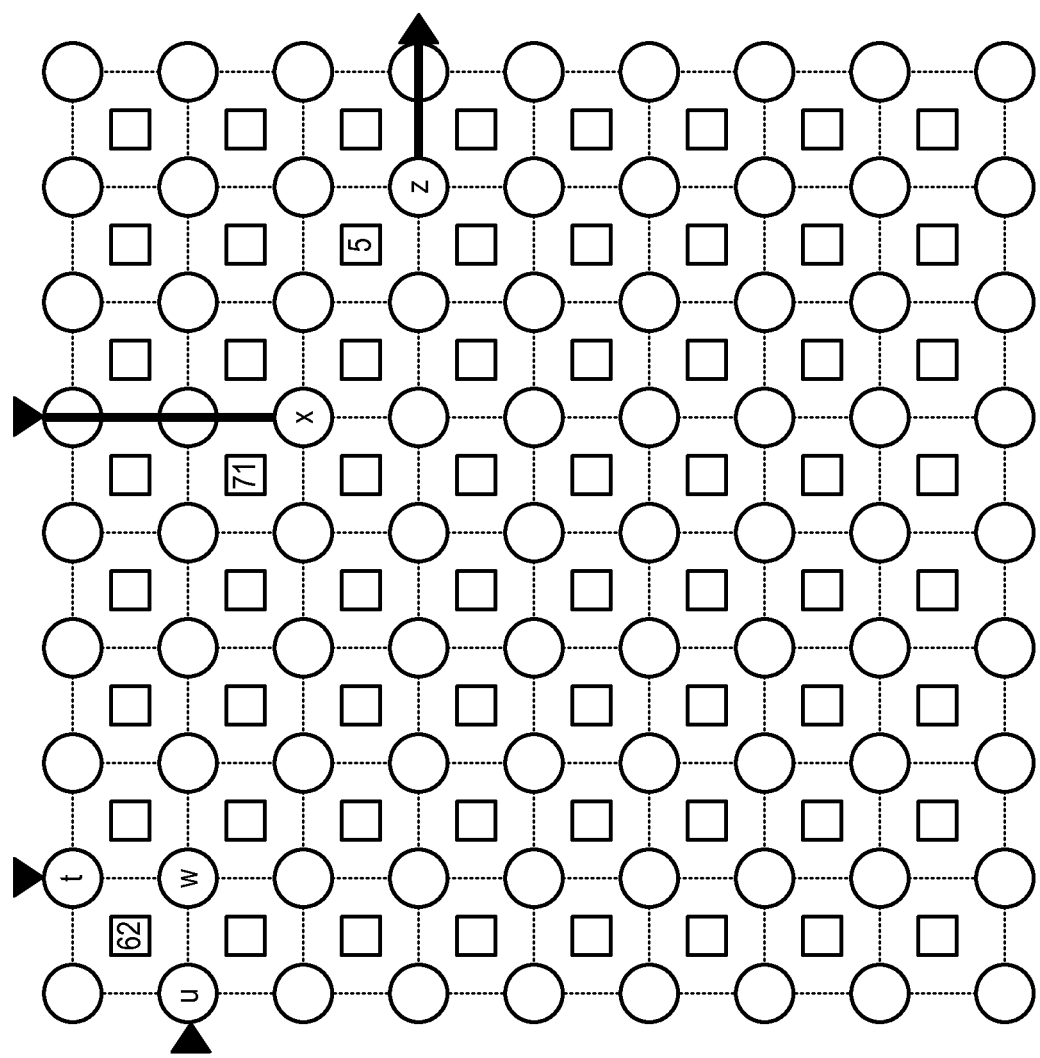

In FIG. 6, task 5 sends the final result (variable "z") off the mesh while tasks 62 and 71 continue to read the next data samples.

FIGS. 1-6 may also represent a graphical user interface (GUI) for specifying the "program" or the desired operation of the system. Thus FIGS. 1-6 may comprise screen shots represented on the display that are used by the user in specifying desired functionality. FIGS. 1-6 may also be displayed during execution to visually indicate to the user the operations as they are being performed. Thus, FIGS. 1-6 may be used as a visualization/debugging/optimization tool.

Although not shown in the above example, this graphical method also shows other detailed mesh activity. For example:

1. Show the state of each PE by changing its color. PE states include: not started, running, stopped, stalled, and waiting.
2. Some PE's may be directed to run more than one task serially. Show which task is being executed by changing the color of the task identifier, making it more prominent, or other means of distinguishing it from the other tasks assigned to that PE.
3. Show synchronization behavior. For example, if a task is waiting for synchronization with two other tasks, display which tasks it is waiting for.
4. Show stalling behavior. For example, a task may be stalled because it is waiting for some other tasks to give up ownership of a common resource. Display the stalling relationship graphically.
5. Show the state of synchronization variables such as mutexes, conditional variables, and semaphores. Also show which PE's are associated with the synchronization variable.
6. Show routing resource conflicts using different colors for various levels of severity.

Creating and Compiling Source Code for a Multi-Processor System

The method may first comprise creating source code that specifies the program desired to be executed. As described below, the source code can be created in any of various programming languages, including textual languages (such as C or C++) and graphical programming languages (such as Simulink and LabVIEW). The source is stored on a memory medium. The source code comprises/specifies a plurality of tasks and communication among the plurality of tasks.

Figure 8B:
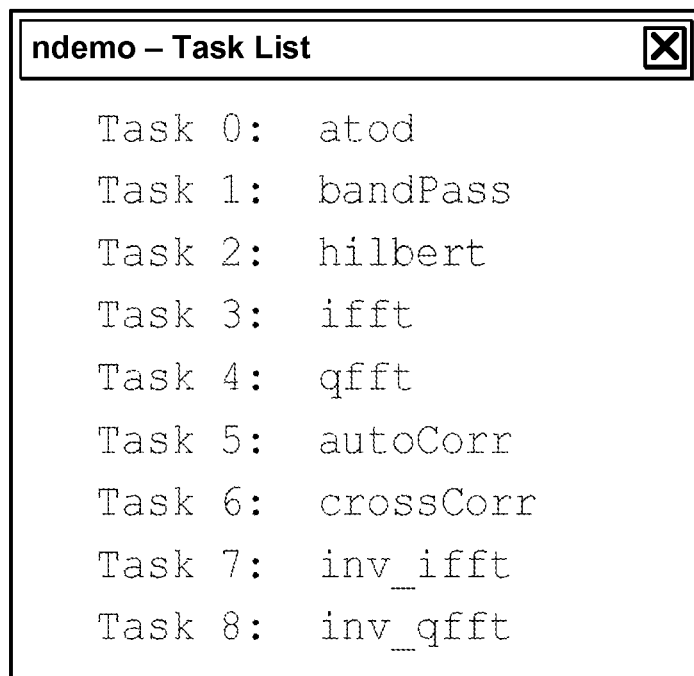
FIG. 8b is a task list extracted from the Main Program (FIG. 8a) to drive automation of optimizations.

In one embodiment of the present invention, ANSI C/C++ is used as the programming language. A C program is written as a collection of computational tasks with communication between them, as illustrated in FIGS. 8*a* and 8*b*. FIG. 8*a* illustrates an example main program representing a system/algorithm in ANSI-C and which uses the MPI API. FIG. 8*b* illustrates task list and connectivity information extracted from the Main Program (FIG. 8*a*) to drive automation of optimizations.

Figure 8C:
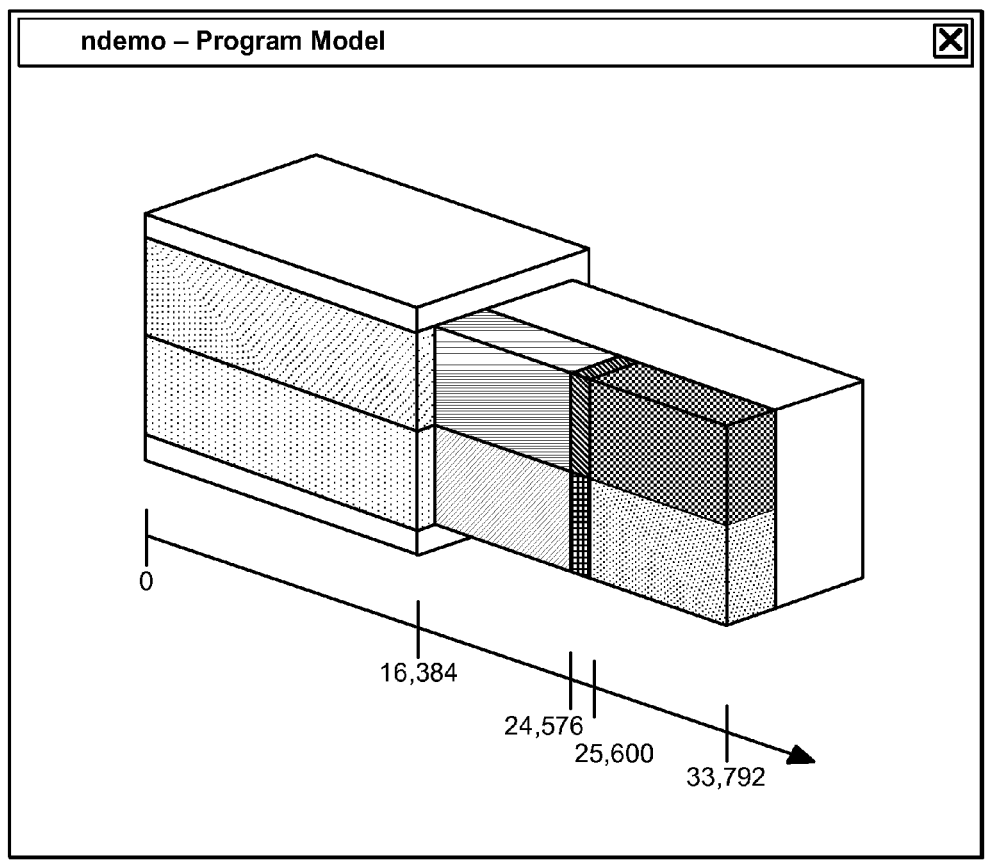
FIG. 8c is the 4-D+ optimized program model shown in 3-D derived from the main program and extracted task information list (FIG. 8b). Optimizations across dimensions include spatial (hardware fabric resources used at a specific point in time), temporal (timeline—represented in cycle-counts in this figure [0; 16,384; 24,576; 25,600; 33,792]), and system constraints. This figure shows the result of the optimization process in terms of resources utilization in response to system constraints (e.g., throughout, latency, power, etc.) as a function of time.
Figure 8D:
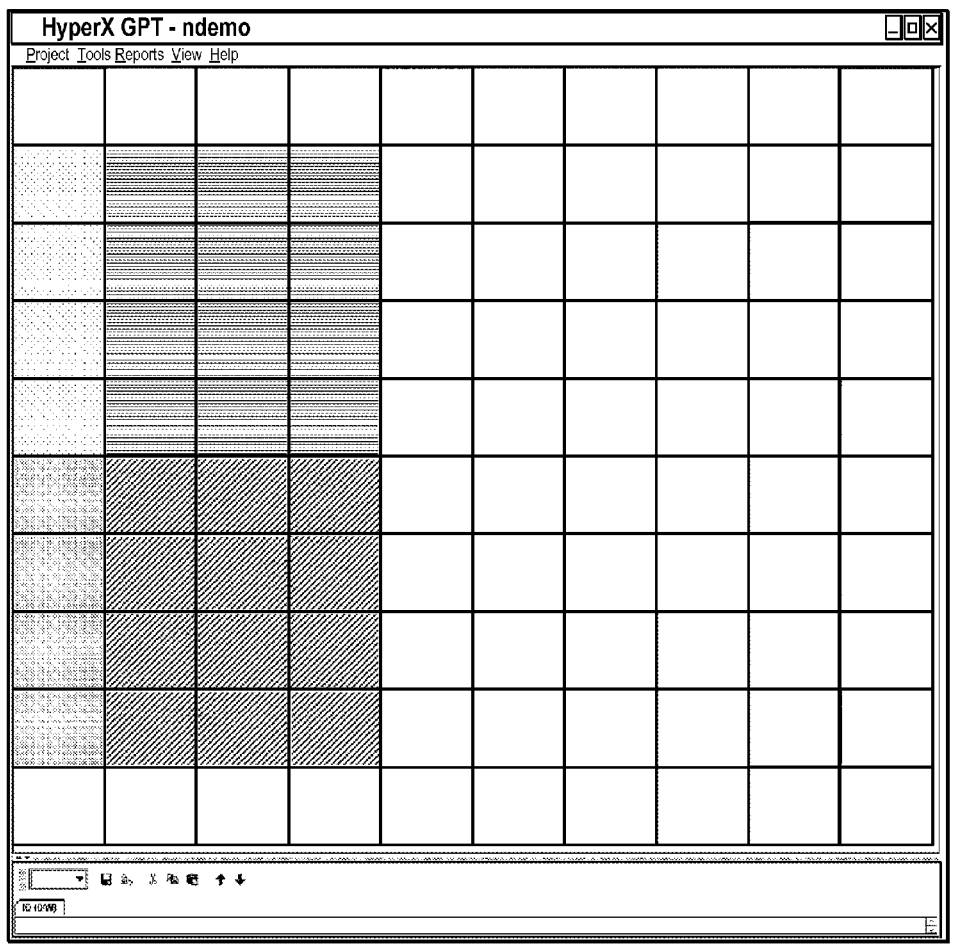
FIG. 8d is a spatial course-grain view of hardware fabric resources of the Program Model (FIG. 8c) from the Main Program (FIG. 8a) in the temporal region between clock-cycles 16,384 and 24,576. Note that the different functional blocks in FIG. 7 are color coded (using gray scale shading/patterning), and the same color coding scheme is used in FIGS. 8c and 8d to trace the execution of functions spatially and temporally.

FIG. 8*c* illustrates a 4-D+ optimized program model shown in 3-D derived from the main program (FIG. 8*a*) and extracted task information list (FIG. 8*b*). Optimizations across dimensions include spatial (hardware fabric resources used at a specific point in time), temporal (timeline—represented in cycle-counts in this figure [0; 16,384; 24,576; 25,600; 33,792]), and system constraints. FIG. 8*d* shows a time slice of FIG. 8*c* representing the result of the optimization process in terms of resources utilization in response to system constraints (e.g., throughput, latency, power, etc.).

A 'C' program can be written like a conventional SPMD (Single Program Multiple Data) program where a single program contains instructions for all processors. Unlike the conventional SPMD compilation practice of compiling the program into a single object code program for all processors, one embodiment of the present invention separates the code and creates a unique object file for each processor in order to conserve memory. Alternatively, programs need not be SPMD and can be implemented as a mixture of:

1. Unique source code per processor.
2. Shared source code between two or more processors. In this case a group of processors may all be performing the same function and it is not necessary to duplicate the code.

In another embodiment, a graphical input mechanism (a graphical programming system) such as the SIMULINK tool from The MATHWORKS or LABVIEW from NATIONAL INSTRUMENTS is used to create the source code. The graphical programming language may more easily model parallelism. Simulink and LabVIEW have a number of advantages. Each is an interactive graphical environment for algorithm development. For example, the Simulink system provides a complete graphical entry system as well as verification environment. Since Simulink is built on top of Matlab, another product from MathWorks, a user can freely mix Matlab and Simulink for design and verification, and then transition the design to pure Simulink for implementation. LabVIEW and MathScript from National Instruments can be used together in a similar fashion. The terms "Simulink", "MatLab" and "MathWorks" are trademarks of The MathWorks. The terms "LabVIEW", "MathScript" and "National Instruments" are trademarks of National Instruments.

Figure 7:
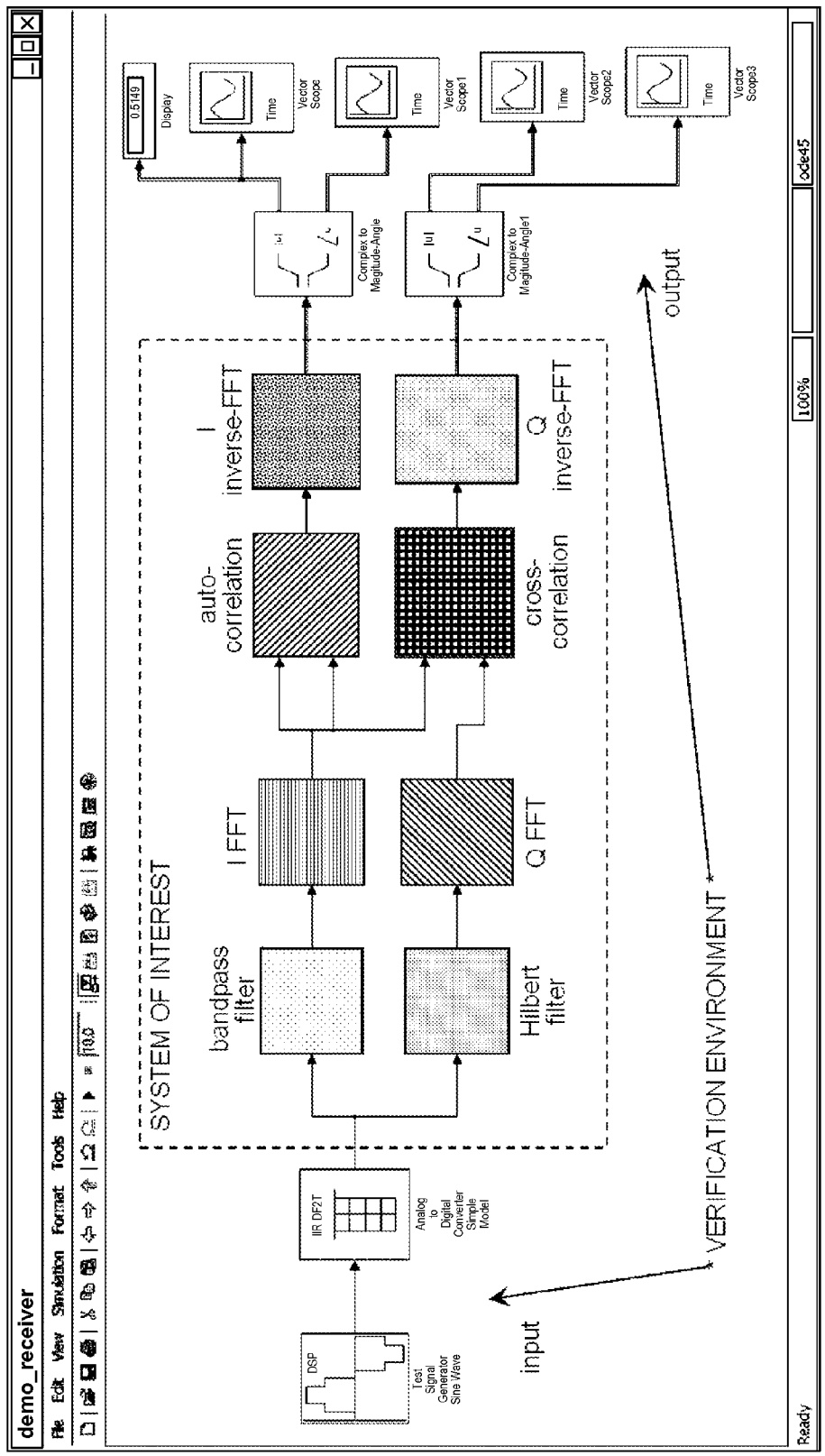
FIG. 7 is an exemplary graphical block diagram which comprises source code for a desired program defining the System—the application model and the system model.

FIG. 7 illustrates an exemplary graphical block diagram created using the Simulink software. The block diagram of FIG. 7 specifies a model of a system or application that is desired to be executed. The block diagram of FIG. 7 essentially comprises source code for the desired program.

In Simulink, the design is represented as a number of connected functional blocks. These blocks are assumed to be acting independently and communicate by passing variables between blocks. Variables may be scalars, vectors, or matrices of fixed or floating data. At the block level, the computational model is the well-known "synchronous dataflow" model. In this model, each block produces its output(s) only after all of its necessary inputs have been received. In addition, each of the external inputs to the design occurs at a fixed rate although inputs with different rates are allowed. Thus, Simulink inherently represents block level parallelism. The blocks may be defined hierarchically or they can be primitives with associated function. The functionality of a primitive may be as simple as an inverter or as complex as a FFT.

The parallelism within a block is handled by the block's implementation. To specify parameters of block level parallelism we employ an approach similar to the "map" idea defined in Parallel VSIPL++. Each functional block has an associated "map" that specifies how a block's computations and variables are distributed across one or more processors on the processor array. For example, the map defines a set of processors to use and how the data of each I/O scalar/vector/matrix is distributed among the processors.

A simple example of the "map" is the matrix multiply operator. Assume it is operating on 100×100 element matrices. The "map" might specify that the block is to use 1, 10, or 100 processors, from which an implementation can be created and performance calculated.

A library of building blocks is parameterized based on the level of parallelism, data distribution schemes, different physical implementations, or different algorithmic implementations; representation different tradeoffs between performance, area, and power. Each block implementation has an associated model use in the optimization process. During design optimization, the design system selects the optimal block implementation from the library and the optimal communication mode between blocks to satisfy system requirements. Different variations of a building block can also be generated on the fly and on demand based on the results and the requirements of the optimization process.

In another embodiment, parallelism is expressed and modeled at the lowest machine level using assembly language.

Figure 9:
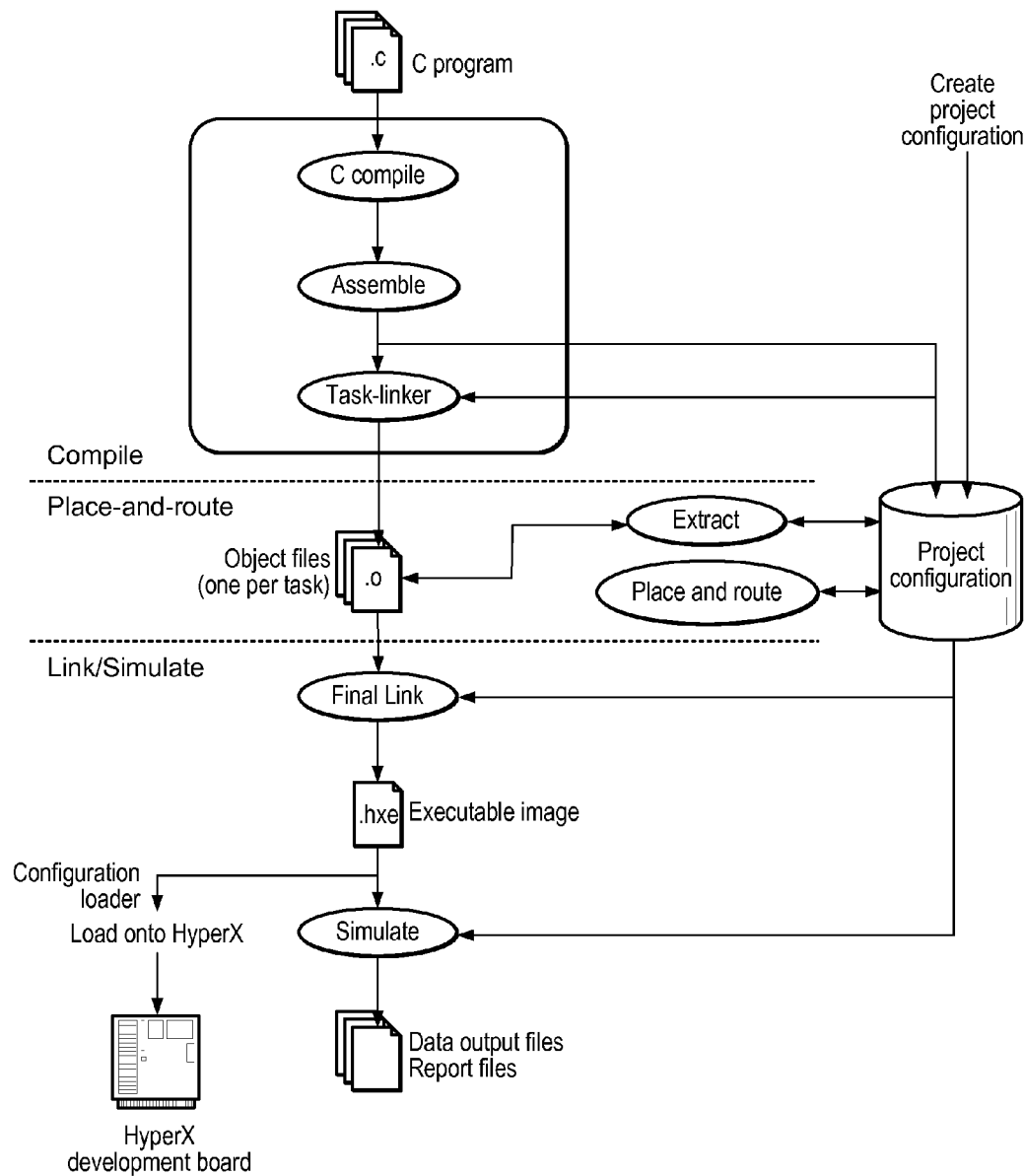
FIG. 9 is an overview of 'C' software development flow.

FIG. 9 illustrates the overall compilation process. The term "compilation process" may be used to refer to most or all of the process shown in FIG. 9, including the C compile, Assemble and Task-linker steps, as well as the Place-and-route step and the Link/Simulate step.

As shown, a program or source code (referred to in FIG. 9 as "C Program") may be created by the user as described above. As noted above, the source code may be created in any of various programming languages, including textual languages and graphical languages. As noted herein, communication between tasks may be specified in the program in symbolic form, e.g., 'send' and 'receive' symbolic form. The term "symbolic form" means that the respective statement in the program that directs communication is not associated with any specific hardware, e.g., is independent of hardware, path, etc.

After the program has been created, C compile, Assemble and Task-Linker steps may be performed. The C compile, Assemble and Task-Linker steps may be performed using standard currently available software. The C compile, Assemble and Task-Linker steps may operate to produce machine language instructions.

The Place & Route step as illustrated in FIG. 9 is then performed. This may involve allocating tasks to processors, allocating memory, and creating communication links between processors. The Place and Route step can be performed manually, automatically, or a combination of both. The term "automatically" in this context refers to performing the place and route without direct user input specifying the place (allocating tasks to processor and variables to memory) and route (allocating routing resources for communication). The choice of how to place and route the design is an optimization exercise that depends on many factors: latency and throughput requirements, power requirements, design size, data size, and array size.

Local variables are allocated to immediate DMRs surrounding the PE executing the tasks that own the local variables, based on data size and resources availability within a particular DMR. Tasks using shared variables to communicate are clustered and allocated to neighboring PEs which share access to the same memory locations. Local variables and shared variables carry low communication overhead because of the proximity to the PEs consuming them. Tasks sharing variables and constrained variables have the highest priority in the process of placing tasks into PEs. Examples of constrained variable include data from off-chip that must be placed near the IO frame and other variables with user supplied constraints for high priority placement. Other Tasks are then allocated based on minimizing communication distance between PEs. Short communication distance reduces latency, improves performance, and decreases power consumption. Communication distance is measured in terms of numbers of hops between the sender and the receiver along the communication path. For example, passing through a DMR adds one hop to the communication distance.

Once the locations of the data, the sending processor and receiving processor of a particular communication are known, the system creates performance models for that communication to optimize the system-level performance of the design. The communication between processors is then synthesized automatically. To facilitate the automatic creation of communication links, the communication is specified in symbolic 'send' and 'receive' form in the program. For example, give all the message passing or tasks unique symbolic names ("a", "b", "c" . . . ). This makes all communication unique but without giving an absolute processor array location (for example, send_data("a", data) instead of send_data((1,4), data), where (1,4) refers to a specific processor location in the multi-processor array). Then the allocation step can manually or automatically assign tasks to any processor array locations. The user doesn't have to specify the hardware mechanism used in the communication link. Communication synthesis includes the automatic selection of the optimal communication modes. Communication can be continuous (streaming transfer), batch (block transfer), and/or overlapped with computations depending the characteristics and needs of the sending and receiving blocks. In the case of the HyperX system, the choice is made between shared memory, memory to memory, memory to register, register to memory, and register to register transfer or a combination of these communication modes, implemented by the shared memory, Quick Port or DMA mechanism.

After placement, a routing step is applied to synthesize all communication links between PEs by binding the communication requirements in the program to physical hardware routing resources. The routing step allocates routing resources based on maximum utilization of all available routing resources to minimize performance-robbing communication congestion and collision and to reduce the potential of fatal communication deadlocks.

For example, Task A expects data from Task B through communication Channel B and data from Task C through communication Channel C, and Channel B and Channel C are dynamic channels assigned to the same physical routing resources based on minimal communication distance criteria. A deadlock occurs when Task A expects data from Task C while Task B attempts to send data to Task A on the same physical channel at the same time. In such case, Task C cannot set up Channel C because the routing hardware is in use by Channel B which stalls (waiting for Task A to respond) and will not release the routing resources to Channel C.

Even if a program is logically deadlock free, it is still possible to have a communication deadlock due to the limited communication resources, the dynamic nature and/or asynchronous nature of the communication and the fact that communication is resolved and bound to hardware during compile time. Therefore, an explicit deadlock removal process is used at the last stage of the routing process to guarantee a deadlock free program.

Many techniques exist today in multi-processor systems for deadlock removal. These techniques are mainly used during run time to break up deadlocks based on some forms of time-out, polling, and monitoring mechanism. While existing techniques can be applied to the present invention to break deadlocks, it suffers from high performance degradation and high hardware overhead in additional to the potential data loss introduced by the deadlock removal mechanism. One embodiment of the present invention employs a low cost deadlock removal scheme to create a deadlock free program during compile time.

To detect potential deadlocks, a communication dependency graph is created for all communication channels supporting multiple message passing. If no dependency exists between communications using the same channel, then no deadlock is possible. If there is dependency then the routing channel can be reassigned so that conflicting communication occur on different physical routes. If re-assignment is not feasible, as in the case of a resources constrained or performance constrained situation, the use of the communication channel is explicitly scheduled and sequenced in a way that deadlock doesn't occur. For example, to remove the deadlock in the above mentioned deadlock case, Task A is modified to send a signal through the Quick Port mechanism to Task B after Channel C transfer is completed. Task B is modified to wait for the signal from Task A before it can transfer data to Task A. The additional handshake added to Task A and Task B ensures that Channel B and Channel C are deadlock free while sharing the same physical routing hardware. The modification of Task A and Task B are performed by inserting code into the object code of the respective tasks automatically during the linking phase with no programmer intervention.

It is possible to allocate one or more tasks to a processor depending on resources constraints, throughput requirements, latency, power, and communication efficiency. It is necessary to allocate multiple tasks to a processor when the number of tasks exceeds the number of processors in the system. It is often desirable to allocate multiple tasks to a processor if it produces a lower power solution or improves communication efficiency. Processor resources are constrained by the instructions and data (both local and shared) memory capacity, and communication resources needed to send or receive data to other tasks on other processors. To allocate multiple tasks to a processor, tasks are "clustered" with the objective of fitting the program into available processor resources and optimizing application performance based on metrics such as latency, throughput, area, and power.

When multiple tasks are assigned to a processor, the execution order is determined either dynamically during run time or statically during compile time. In dynamic scheduling, each processor keeps track of the conditions under which each task can be executed and then execute them when they are ready. Static scheduling creates an execution order during compile time so that a task is scheduled to be executed only when all its prerequisite data is available. The scheduling process serializes parallel tasks for execution by a single processor without deadlocks. Deadlocks are detected by augmenting the task graph with the dependencies introduced by the clustering and scheduling process. Cycles in the task graph correspond to potential deadlock conditions, which are removed by changing the clustering or scheduling scheme.

Communications between tasks allocated to the same processor are performed using variables/memory shared between the tasks within a processor, resulting in the most efficient form of communication between tasks. Since the tasks cannot be executed concurrently, there is also no need for synchronization on this type of data.

Memory allocation follows similar tradeoffs of throughput, latency, power, and resources constraints. For example, a vector of data can be arranged in many different ways:

Entirely in one memory.
Copied to N memories.
Broken into N pieces and distributed to N memories (with many different ways to break up the data).
Broken into N pieces and copied to many memories so that each processor involved in the calculations has access to a complete set of the data particularly useful in.
Stored in an off-chip memory.

In addition, a model of data storage "reuse" is created using an understanding of data lifetimes. Storage reuse means that the storage of an input to a block can be re-used to store the block's output data or temporary data. For example, if you are calculating o=a+b+c+d, you might need 2 temporary storage locations for partial results: tmp1=c+d, tmp2=b+tmp1, and then o=a+tmp2. By employing re-use, temporary storage could be eliminated altogether and the output data could reuse the storage of a, b, c, or d. This is particularly important when a, b, c, and d are very long vectors or very large matrices. Thus depending on the data types, the operations in an algorithm can be defined to enable reuse. Furthermore, if latency is at a premium and the input matrix data for a matrix multiply block is arranged all in one memory, the first thing the block implementation might do is to copy the data to more memories and then begin parallel calculations from there.

The keyword _shared identifies that a variable will be shared across tasks. For example, _shared int xyz identifies the integer variable xyz as a shared variable. Shared variable is used as a form of communication between tasks. Synchronization between tasks in accessing the shared variable is through the use of semaphores. In the HyperX example, semaphores are registers with special hardware support. A mutex (mutual exclusive) semaphore is a 1-bit register that is used to flag mutual exclusive ownership of some resource by a task. When a mutex semaphore (and implicitly, the shared resource) is owned by a task, it is locked and the shared resource cannot be simultaneously accessed by other tasks that are respecting the semaphore. The communication synthesis step automatically ensures that communication using shared variables is appropriately protected using semaphores.

For explicit modeling communication between processors, a parallel programming industry standard called Message Passing Interface (MPI) is used. MPI is an API whose implementation is specific to a particular platform. For example, MPI libraries exist for systems of PC's communicating across a typical local area network. The MPI standard contains over 120 functions but only a subset is needed for a single chip multi-processor system like the HyperX. These functions are implemented in software or, for efficiency, could be implemented in hardware Examples of MPI functions are as follows:

| MPI Call | What it does |
|---|---|
| MPI_Init | Initialize |
| MPI_Finalize | Cleanup |
| MPI_Send | Sends data to another task |
| MPI_Receive | Receives data from another task |
| MPI_Initroute | Creates a route from one processor to another |
| MPI_Endroute | Removes a route from one processor to another |
| MPI_Wait | Wait for communication to complete |
| MPI_Test | Test if a communication is complete |
| MPI_Lock | Lock a mutex vaiable |
| MPI_Unlock | Unlock a mutex variable |
| MPI_Broadcast | Send data to a select group of processors |
| MPI_Barrier | Synchronize a set of processors by putting each task in a wait state until all participating tasks have arrived at certain point. |
| MPI_Reduce | Combines a partial result from a group of processors For example, to add N integers (each located on a separate processor) invoke the "Reduce ADD" operation on the set of processors. |

At this point in the flow, all variable assignment, shared memory, and inter-process communication have been resolved and implemented. The final step of the tool flow is to assemble code streams into an executable object image file suitable for execution by a processor. Effectively, a compilation methodology has been created to produce object code from C for a heterogeneous or homogeneous array of processors using conventional compilers written to generate code for a single processor system. The ability to use a conventional compiler without rewriting it for a multi-processor application is important because the need to build a variety of multi-processor systems using different processors.

The Spatial-Temporal Algorithm Viewer/Editor allows the algorithm designer to understand the relationship between what the algorithm is computing, where it is computing it, and when it is computing it.

Figure 10:
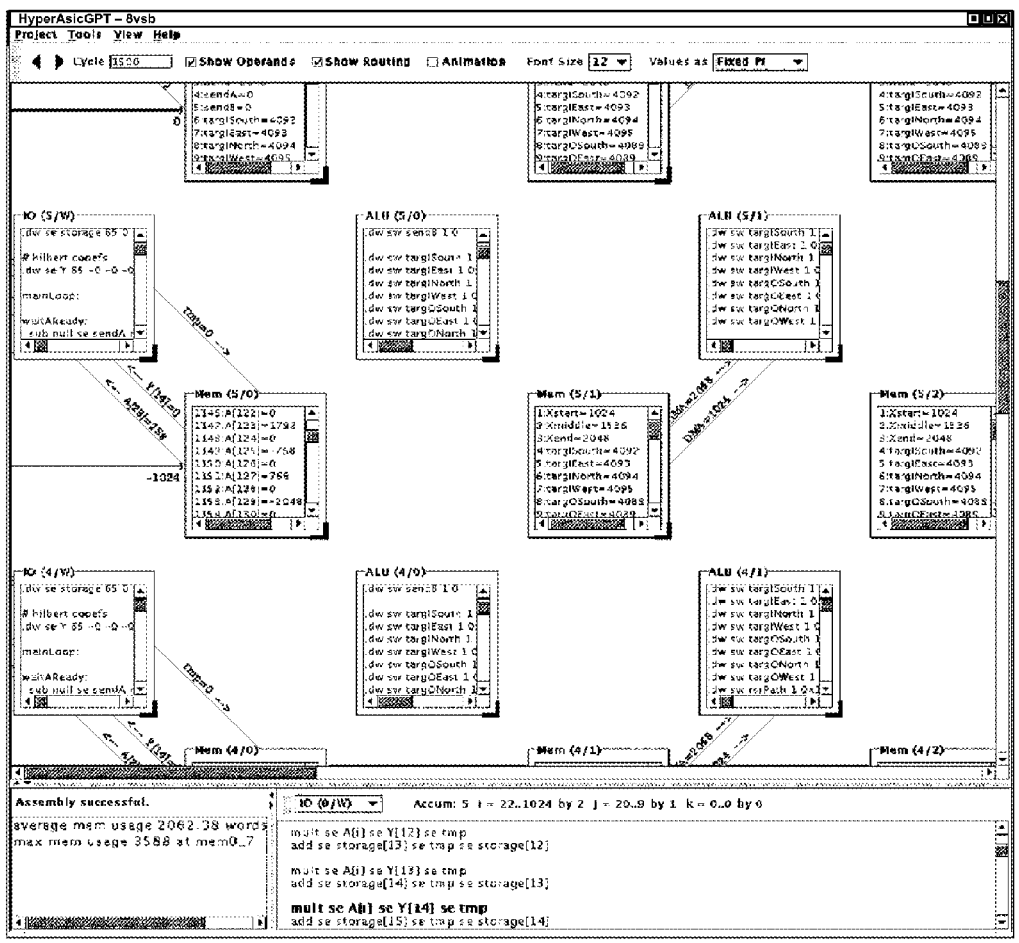
FIG. 10 illustrates the Graphical Layout Tool (GLT)/Graphical Programming Tool (GPT) view providing the low-level view of the target architecture with tasks and communication allocated. Each rectangle represents a PE or a DMR, showing internal states of the respective block. Lines between PEs & DMRs represent data communication between them This view provides a complete interactive simulation and hardware design/debugging environment, and is able to track performance, power, and other useful metrics to aid in design/development.

FIG. 10 illustrates the Graphical Layout Tool (GLT)/ Graphical Programming Tool (GPT) view providing the low-level view of the target architecture with tasks and communication allocated. Each rectangle represents a PE or a DMR, showing internal states of the respective block. Lines between PEs & DMRs represent data communication between them This view provides a complete interactive simulation and hardware design/debugging environment, and is able to track performance, power, and other useful metrics to aid in design/development.

Figure 11:
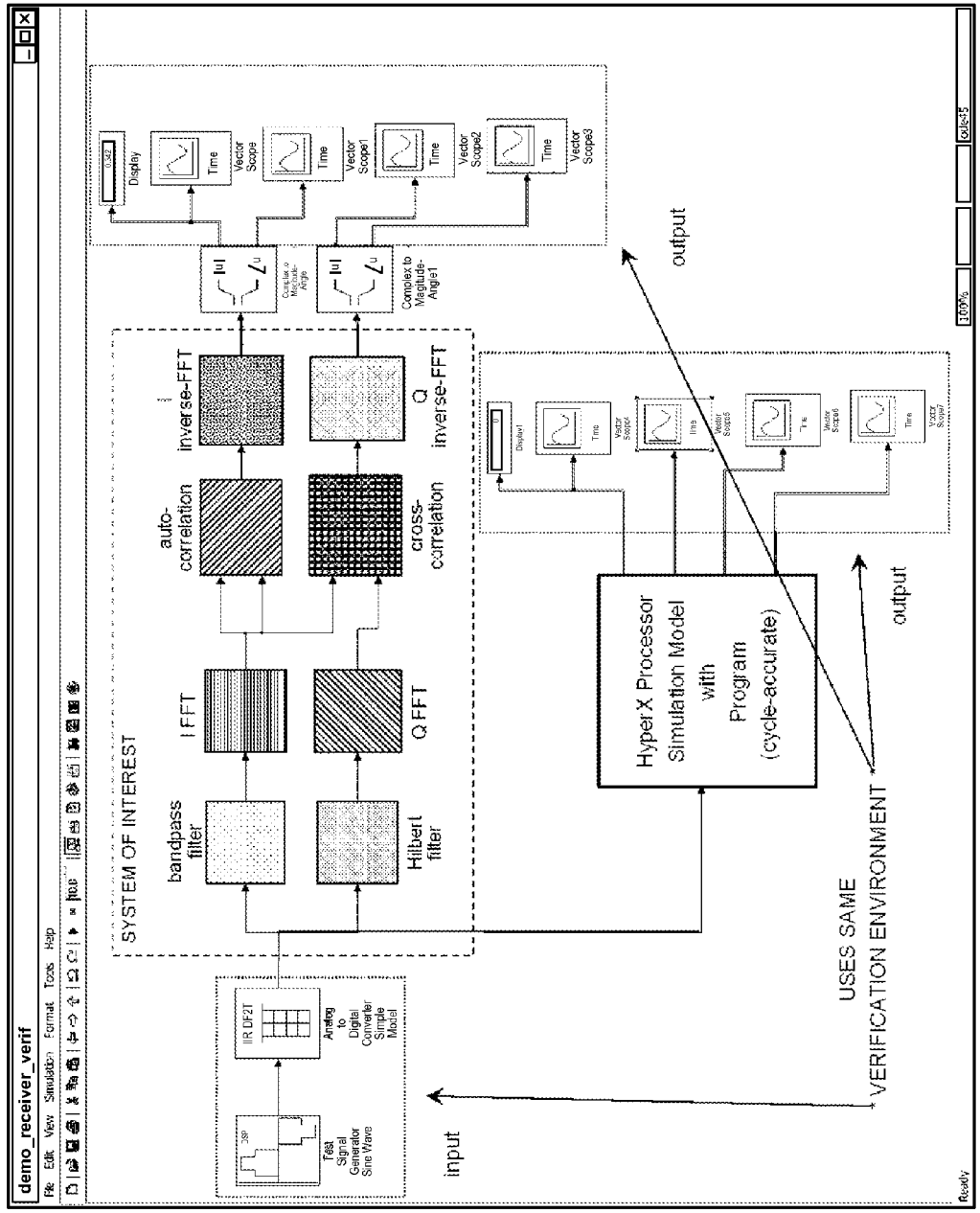
FIG. 11 illustrates that the performance capturing simulator and developed program can be interfaced into 3rd party system-level development tools to provide golden verification at the system-level. The same input from the system level model is used to verify the design. The output of the design is compared against the golden output of the system model. This enables a rapid development and verification flow.

FIG. 11 illustrates that the performance capturing simulator and developed program can be interfaced into 3rd party system-level development tools to provide golden verification at the system-level. The same input from the system level model is used to verify the design. The output of the design is compared against the golden output of the system model. This enables a rapid development and verification flow.

Therefore, the method described herein provides a number of advantages. As described above, in a multi-processor system, there are multiple means of communication between processors, each representing different trade off between latency, throughput, and power. The user program does not have to explicitly select which communication mechanism to use. Rather, the communication is synthesized based on the knowledge of the location of the processor and the layout of the data which can be derived either manually or automatically. The system may create a performance model to optimize for latency, throughput, and power and selected the optimal communication mechanism.

Tasks are linked by symbolic communication links and are allocated to processors to satisfy design constraints. The symbolic links are resolved and the optimal communication mode is selected to satisfy design constraints. A programmer thus does not have to worry about the physical location of a processor. The source and destination of the message send and receive command are expressed in symbolic terms, so that the exact location of the processor can be allocated optimally to satisfy design constraints. Shared variables may be used as a means of communication between the tasks executing on the processors.

Thus the method described herein provides a general compilation strategy for multi-processor system that supports the use of different processors in the multi-processor system. In one embodiment, the method uses a conventional (existing) compiler for serial code without developing a specialized parallel compiler. Unlike the conventional approach in which the instruction memory of all processors in a multi-processor system is loaded with an identical object code image, in one embodiment the object code is separated so that the instruction memory of a processor is only loaded with the instructions assigned to it.

In one embodiment, a graphical programming specification is used where the design is represented as a number of connected functional blocks, e.g. a data flow diagram. The graphical data flow diagram provides a graphical way to express and specify parallelism. The functional blocks can be parameterized based on number of processors and memory usage model. The parameterized block implementations are selected and optimized to satisfy design constraints. Thus, memory usage and allocation are optimized, communication between blocks is optimized, and functional blocks can be scheduled to be executed by single or multiple processors. In an alternate embodiment, parallelism is modeled in C by writing a SPMD program.

A message passing interface (MPI) may be used to communicate. MPI message passing, as used in a conventional multi-processor system communicating over a local area network, has high overhead relative to memory access. In the case of the Hyper X architecture used in the preferred embodiment, the communication overhead is relatively small compared to memory access because of the extensive on-chip communication facilities, thus enabling an architecture with relatively small memory per processor.

A spatial-temporal development GUI/viewer may be used to enable the user to visually specify the program and/or to view the operation of the program.

The invention claimed is:

1. A computer-implemented method for creating a program for a multi-processor system, wherein the multi-processor system comprises an array of processors and a plurality of memories coupled to the processors, wherein the plurality of memories are interspersed among the plurality of processors within an apparatus, wherein each of the processors is coupled to at least one other processor, the method comprising:
storing source code in response to user input, wherein the source code specifies first functionality, wherein the source code is intended to execute on the multi-processor system, wherein the source code specifies a plurality of tasks and communication of data among the plurality of tasks, wherein the source code further does not specify allocation of local variables among the plurality of tasks;
creating machine language instructions based on the source code, wherein the machine language instructions are designed to execute on the array of processors;
determining an assignment of tasks to respective processors in the multi-processor system;
subsequent to the determining, selecting communication mechanisms between tasks assigned to the respective processors based on location of the respective processors in the array and required communication of data, wherein the selecting includes:
allocating local variables to memories proximate to two or more processors assigned to execute tasks that own the local variables; and
configuring message passing links via a plurality of communications units coupled to processors in the array of processors, wherein the message passing links are for tasks that are assigned to processors that do not share proximate memories, and wherein the configuring includes synthesizing the message links between processors by binding communication requirements in the source code to routing logic; and
storing the machine language instructions in various ones of the plurality of memories, wherein the multi-processor system is operable to execute the machine language instructions using the allocated local variables and configured message passing links to implement the first functionality.

2. The method of claim 1,
wherein said allocating local variables to memories is performed based on data size and resource availability within the memories.

3. The method of claim 1,
wherein each of the communication units comprises a memory and routing logic.

4. The method of claim 1, wherein the determining an assignment of tasks includes assigning tasks that use common shared variables to neighboring processors which share access to the same memories.

5. The method of claim 4, wherein the determining an assignment of tasks includes assigning tasks that use common shared variables prior to allocating tasks that do not have common shared variables.

6. The method of claim 1, wherein the source code specifies communication in symbolic form.

7. The method of claim 1,
wherein the source code specifies a first message, at least one message send command for the first message, at least one message receive command for the first message, source information for the first message, and destination information for the first message; and
wherein the source information and the destination information are expressed in symbolic terms, wherein the source information and the destination information do not specify a location of a processor to execute the at least one message send command and the at least one message receive command;
the method further comprising allocating tasks sending and/or receiving messages to specific processors.

8. A non-transitory computer readable memory medium comprising program instructions for creating a program for a multi-processor system, wherein the multi-processor system comprises an array of processors, wherein each of the processors is coupled to at least one other processor, wherein there are multiple communication mechanisms between the respective processors, wherein the program instructions are executable to:
access source code from memory, wherein the source code specifies first functionality, wherein the source code is intended to execute on the multi-processor system, wherein the source code specifies a plurality of tasks and communication of data among the plurality of tasks, wherein the source code does not explicitly specify which physical processor executes each task, and wherein the source code further does not specify which communication mechanism to use among the plurality of tasks;
create machine language instructions based on the source code, wherein the machine language instructions are designed to execute on the array of processors,
assign tasks for execution on respective processors, including to store machine code associated with the tasks on memories connected to the respective processors that will execute the tasks;
subsequent to assigning the tasks for execution, select communication mechanisms between the processors based on location of the respective processors and required communication of data, wherein the selection of communication mechanisms includes to:
allocate local variables to memories proximate to two or more processors assigned to execute tasks that own the local variables; and
configure message passing links via a plurality of communications units coupled to processors in the array of processors, including to synthesize message passing links between processors by binding communication requirements in the source code to routing logic, wherein the message passing links are for tasks that are assigned to processors that do not share proximate memories;
wherein the stored machine code is executable on the multi-processor system to implement the first functionality.

9. The memory medium of claim 8,
wherein said allocating local variables to memories is performed based on data size and resource availability within the memories.

10. The memory medium of claim 8, wherein to assign tasks for execution on respective processors, the program instructions are further executable to:
assign tasks that use common shared variables to neighboring processors which share access to the same memories.

11. The memory medium of claim 10, wherein to assign tasks for execution on respective processors, the program instructions are further executable to:
assign tasks that use common shared variables prior to allocating tasks that do not have common shared variables.

12. The memory medium of claim 8, wherein the source code specifies communication in symbolic form.

13. The memory medium of claim 8,
wherein the source code specifies a first message, at least one message send command for the first message, at least one message receive command for the first message, source information for the first message, and destination information for the first message;
wherein the source information and the destination information are expressed in symbolic terms, wherein the source information and the destination information do not specify a location of a processor to execute the at least one message send command and the at least one message receive command; and
wherein the program instructions are further executable to allocate tasks sending and/or receiving messages to specific processors.

* * * * *